Nov. 2, 1954            R. L. SEIDMAN            2,693,233
DEVICE FOR CUTTING A WEB OPERATED RESPONSIVE
TO THICKENED PORTIONS OF THE WEB
Filed July 2, 1949                                                   3 Sheets-Sheet 1

INVENTOR
RICHARD L. SEIDMAN
BY
ATTY.

Nov. 2, 1954  R. L. SEIDMAN  2,693,233
DEVICE FOR CUTTING A WEB OPERATED RESPONSIVE
TO THICKENED PORTIONS OF THE WEB
Filed July 2, 1949  3 Sheets-Sheet 2

INVENTOR
RICHARD L. SEIDMAN
BY
ATTY.

United States Patent Office 2,693,233
Patented Nov. 2, 1954

2,693,233

DEVICE FOR CUTTING A WEB OPERATED RESPONSIVE TO THICKENED PORTIONS OF THE WEB

Richard L. Seidman, Norwalk, Conn.

Application July 2, 1949, Serial No. 102,746

6 Claims. (Cl. 164—42)

My invention relates to cutting apparatus, and more particularly has reference to apparatus for cutting strips from continuous material, especially material in the form of continuous webbing, ribbon, or the like, and to apparatus which is particularly adapted for use as an accessory to and in combination with an existing machine wherein work operations are carried out on said material to place it in a condition to be severed into said strips.

Objects of the invention are to provide cutting apparatus having feed means and cutting means wherein the feed means advance continuous material to be cut to said cutting means and also control the actuation of said cutting means in accordance with the thickness of the material fed by said feed means, and particularly to provide cutting apparatus having detector-actuator mechanism wherein said feed means mechanically detect the thickness of the material engaged thereby and cause electrically operated means to predeterminedly actuate the cutter means for cutting the material into strips as well as to provide special adjustable cutting means.

Still further objects of the invention reside in the provision of cutting apparatus adapted to engage continuous material which is undergoing movement lengthwise of itself and to continue this lengthwise movement, without interruption, towards cutting means for severing the material into strips, and especially cutting apparatus wherein lengthwise movement of material engaged thereby is continued at a speed synchronized to that at which the material is moved towards the apparatus for engagement and continued movement; to provide cutting apparatus for cutting continuous material into strips, in combination with delivery mechanism which is adapted to deliver the material to said cutting apparatus and at the same time to drive said cutting apparatus; and to provide, in a combination of the character described, special drive means connecting the delivery mechanism to feed means in the cutting apparatus for driving said feed means at a rate such that the material advanced by the feed means to cutting means in the apparatus will be moved at substantially the same rate that the material is received by the feed means.

These and other objects of the invention will in part be obvious and will in part appear hereinafter.

The invention accordingly comprises the apparatus possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
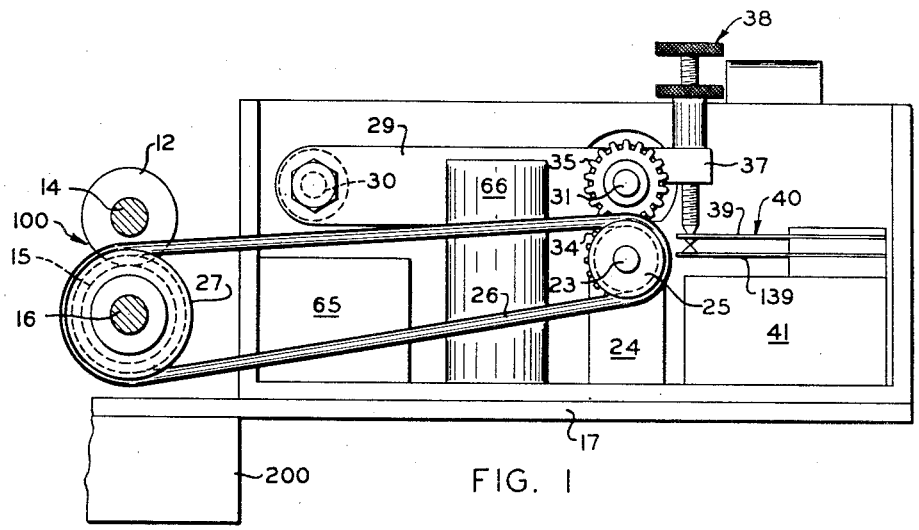
Figure 1 is a side elevation of the cutting apparatus of my invention with a cover member removed, and also shows the apparatus in association with parts of a sewing machine for the purpose of illustration.

Certain industrial operations require that continuous material of the character having thick portions, humps, or bumps at spaced apart intervals, extending lengthwise of the material, be cut or severed transversely at predetermined locations. It frequently occurs that the material is undergoing movement or advancement in a direction lengthwise of itself following the work operation to finish it in its final continuous form.

In certain instances it is desirable, to carry out the cutting operations, for severing the finished continuous material while continuing its movement from the work station at which it was placed in finished continuous form. In this regard, the continuous material may be advanced from said last work station to the feed for a cutting device. Under such circumstances it is necessary to synchronize the speed of movement of the feed for the cutting mechanism and the actuation of the cutter thereof with the speed of movement of the material as it is advanced from said last work station.

For example, in making women's garments, such as slips, it is customary to form the shoulder straps of scrap material remaining from the cloth from which the panels of the slip are cut. This scrap is trimmed to width and cut into sections of from four inches to twenty-four inches in length. These sections are sewed together, end to end, to provide continuous material. The width of this continuous material is about three times that of the finished strap. The partially finished continuous strap material is run through a sewing machine which has a folder mechanism and two parallel needles. After undergoing folding and double edge sewing operations, the continuous material is in the form of a ribbon, or web, or the like, with overturned edges and of finished width dimension but has thick portions where adjacent sections are overlapped in joining relation. Individual straps are formed by cutting the material in back or in front of each thick portion. The thick portions or humps at the end of each strap are useful for the purpose of retaining a buckle on the strap.

By conventional practice, two pressed together delivery or pinch rolls, between which the material is engaged, are associated with the double needle sewing machine and by exerting a slight tension on the material assures its removal from the sewing machine preparatory for cutting the continuous material into the desired sections. One of these rolls is driven by the sewing machine, and the two rolls are geared together to rotate at the same speed.

Strap forming and strap cutting operations, of the character described, serve admirably for the purpose of illustrating my invention and the same will be described in connection therewith.

In the drawings, the reference numeral 10 generally indicates cutting apparatus adapted to be employed in combination with delivery mechanism which is generally indicated by the numeral 100 and which is designed to carry out several functions. One function of the delivery mechanism 100 is to move continuous material which is to be cut, without interruption, in a direction lengthwise of itself and towards the cutting apparatus 10 for engagement by feed means of the cutting apparatus. Another function of the delivery mechanism 100 is to drive the feed means of the cutting apparatus.

The feed means of the cutting apparatus are mounted within what may be noted as a feeding section of the apparatus 10. This feeding section is generally indicated by the reference character 110. These feed means are located in a position to engage the continuous material advanced by the delivery means and are adapted to continue the lengthwise movement of the material, without interruption, by advancing the material to cutter means operable to effect the desired severing of the material. The cutter means are mounted within the apparatus 10 in what may be treated as a cutting section which is generally indicated by the reference character 210.

A detector-actuator mechanism, making use of mechanically and electrically operated means, effects actuation of the cutter means in accordance with the thickness of the material advanced by the feed means and completes, in a broad sense, the essential instrumentalities of the cutting apparatus 10.

The delivery mechanism 100 may be a part of any existing machine adapted to perform a work operation on the continuous material, and may be driven by the power source which drives said machine or by an independent power source. In this regard, the cutting apparatus 10 will generally serve as an accessory to said existing machine and enables the machine to carry out an additional work operation.

Specifically, for the purpose of illustration, delivery mechanism 100 is represented as comprising a pair of conventional and similar pinch rolls 12 and 15 employed with a double needle sewing machine of the character heretofore described. Rolls 12 and 15 are fixed, respectively, to shafts 14 and 16 which are conventionally and rotatably supported upon the sewing machine table, generally indicated by the reference numeral 200. Shafts 14 and 16 are geared together by gears (not shown) and in a manner similar to the shafts for the feed means to be presently described. The gearing for shafts 14 and 16 effects rotation of these shafts at similar speeds. The shaft 16 and the roll 15 fixed thereto may be driven by an overdrive connection (not shown) with the sewing machine drive whereby continuous material, engaged by the rolls 12 and 15, is moved by them at a linear speed which is synchronized with the movement of the continuous material through the sewing machine. As the sewing machine proper forms no part of my invention, details thereof have been omitted and sewing machine elements which are illustrated have been represented somewhat diagrammatically for the purpose of simplification.

As shown in the drawings, the cutting apparatus 10 is adapted to be aligned with the delivery mechanism 100. Cutting apparatus 10 is mounted upon a base plate 17, one end of which is seated upon the sewing machine table 200. The base plate 17 may be additionally supported from the sewing machine table 200 by any conventional means, such as a bracket, or the like. Seated on the base plate 17 is a housing for the feeding section 110. This housing comprises a back wall 19 and end walls 20 and 21 which extend above a bottom plate. The front edge of the housing for the feeding section is located adjacent the front edge of the base plate, and this housing is fixed to the base plate 17 by any conventional means. A detachable cover member 18 of sheet material may be employed to close the front of the housing for the feeding section. (See Fig. 2.)

The cutting section 210 is an enclosure which includes the back edge of the base plate 17 and which is formed by a casting mounted upon the base plate. The forward face of this casting is spaced rearwardly from the back wall 19 of the feeding section housing so that a passageway between these partitions is provided. This passageway is adapted to be aligned with the discharge from the delivery mechanism 100 so that material delivered by the mechanism 100 may be drawn through the passageway by the feed means of the apparatus, and fed to the cutter means thereof. To assist in guiding the material through this passage to the feed means, use is made of a feed tube or guide 22 fixed to the back wall 19.

The feed means for the cutting apparatus comprises a shaft 23 which is mounted on a suitable bearing block 24 supported upon the bottom plate of the feeding section housing. Shaft 23 is rotatably mounted upon the block 24 and extends through the rear wall 19 of the housing for the feed means and through the cover member 18 when the latter is mounted. The forward end of the shaft 23 is provided with a belt pulley 25 which is connected by means of belt 26 to a belt pulley 27 fixed on the end of the driven shaft 16. It is to be observed that belt pulley 27 is of a greater diameter than the belt pulley 25 whereby the latter and the shaft 23 will be rotated at a greater peripheral speed than that of the driven shaft 16.

A feed roll 28 is fixed on the rearward end of shaft 23 which extends through the back wall 19 of the housing for the feed means.

Other parts of the feeding means comprise a floating or rock arm 29 which is pivoted to a stub shaft 30 fixed to the wall 19. Extending through the end of the floating arm 29, opposite the pivot shaft 30, is a shaft 31 on which is loosely mounted an idler roll 32 adapted to cooperate with the driven feed roll 28. The force of gravity, and/or a spring, constantly urges the floating arm 29 and the idler roll 32 into contact with the driven roll 28 of the feed means. An opening in the cover member 18 and in back wall 19, permits the shaft 23 to extend therethrough. Also, the opening in the back wall 19 permits the shaft 31 to extend therethrough and allows for the elevation of this shaft in accordance with the thickness of the material passing between the feed rolls.

It is to be observed that shafts 14, 16, 23, 30 and 31 are all substantially parallel to each other and are located substantially at right angles to the direction of flow of the material to be cut.

Rolls 28 and 32 together provide the feed means for the continuous material and are adapted to engage the continuous material 33, delivered by the pinch rolls 12 and 15, and to continue the advancement of this material towards the cutter means of the apparatus 10. It may be observed that the arm 29 and the idler roll 32 are so mounted that when a thick portion passes between the feed rolls 28 and 32 the arm 29 and the idler roll 32 will be elevated.

Shafts 23 and 31 are geared to each other by means of gears 34 and 35 which are fixed, respectively, to said shafts. Gearing the shafts together in this manner assures a drive for the feed rolls 28 and 32 of such character that when a part of the continuous material, which has a thick portion, reaches the rolls it will be engaged thereby and fed through them and will not wedge and prevent operation of the feed.

In all embodiments of the invention, elevation of the arm 29, when detecting the passage of a thick portion between the feed rolls, is adapted to actuate switch mechanism and to initiate operation of the cutter means of the cutting apparatus 10. For this purpose the arm 29, at the end thereof most distant from its pivot, is provided with a hub portion 36 which carries a finger 37 through which there extends an adjustable contact screw 38 adapted to actuate said switch mechanism by electrically insulated contact with a blade element thereof. In this manner the feed means forms a part of the detector-actuator mechanism for the cutter means of the apparatus.

The switch operated by the arm 29 is generally indicated by the reference numeral 40 and comprises a resilient switch blade 39 and a fixed switch blade 139 which may be suitably mounted on back wall 19 or at any other convenient location. In the embodiment of the invention illustrated in Figs. 1 through 5, contact screw 38 is normally in electrically insulated contact with the resilient switch blade 39 and maintains the switch closed at times when a thin portion of the continuous material is between the feed rolls 28 and 32. However, when the arm 29 is elevated, the resiliency of the switch blade 39 causes it to break contact with the blade 139.

As will more fully appear in the actuator circuit, disclosed in conjunction with Figs. 1 through 5, opening of the switch 40 causes operation of a relay which in turn effects the operation of a rotary solenoid 42. The housing for the solenoid 42 is fixedly secured within the cutting section casting by conventional mounting means (not shown) and the rotatable member of the solenoid is appropriately connected to rotatably mounted cutting means whereby to drive the cutting means for carrying out a severing operation when the solenoid is energized.

Also, as will presently appear, in this actuator circuit the relay 41 is by-passed when the arm 29 is lowered to close the switch 40 after a thick portion of the material is passed between the feed rolls 28 and 32. This permits the solenoid 42 to rotate to the end of its stroke where the solenoid closes another switch which places the relay 41 back into the circuit and cuts out the solenoid. Return of the solenoid 42 to its inactive position opens the last-mentioned switch and leaves the actuator circuit in proper condition for the start of the next cutting cycle.

Other electrical components used with the actuator circuit comprise a condenser 66 and a rectifier 65, both mounted within the housing for the feeding section 110 as is also the case of the relay 41.

With particular reference to the cutting section of the device, this comprises a casting having suitable bearing means in which a cutter shaft 43 is rotatably mounted. Solenoid 42, as heretofore mentioned, is a rotary solenoid and is of a type which is provided with a spring actuated return (not shown). This type of solenoid is provided with a shaft 44. As may be observed in Fig. 3, shaft 44 is coupled to shaft 43 by a conventional multi-jaw coupling 45. It will be apparent that rotation of the solenoid 42 will cause the shafts 44 and 43 to be similarly rotated. A disk 46 is fixed on the end of shaft 43 most distant from the coupling 45 by any conventional means which, if desired, may permit adjustment of the disk. This disk 46 is adapted to have a knife member 47 fixed thereto by suitable fastenings in the manner shown in Figs. 3 and 4.

Solenoid 42 is so designed that a current impulse causes it to rotate by substantially 25°. When the solenoid is actuated there is a thrust which causes axial movement of the solenoid armature and shaft 44 thereof. Hence, it is desirable to arrange the coupling 45 so that, when the solenoid is at rest, the jaws of the coupling are spaced slightly apart axially. This axial motion is of the order of about 0.40 inch so that only a slight axial separation of the coupling members, during periods of inactivity, is required.

Coupling 45 has an arm 48 fixed thereto for rotation therewith. This arm carries an adjustable contact screw 49 which, as shown in Figs. 3 and 5, is adapted to close a switch 50, one contact blade 51 of which is resilient and is constantly urged away from a relatively immovable contact blade 151. Closing of the switch 50, in the circuit employed in Figs. 1 through 5, is adapted to de-energize the solenoid with the result that the knife member 47 is returned to its inoperative position.

Figure 2:
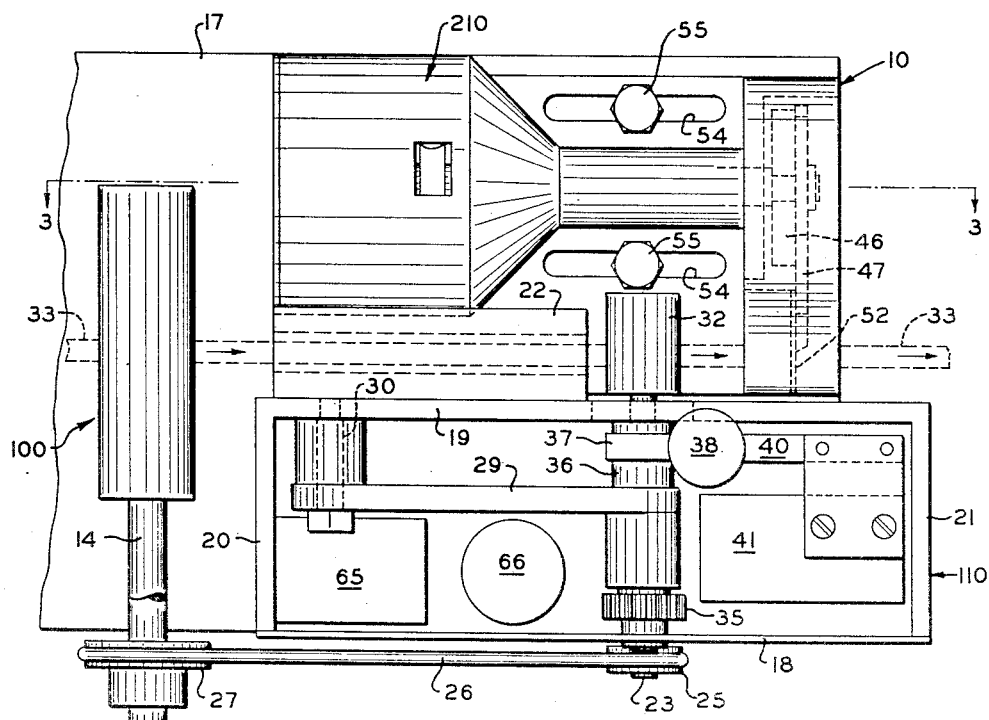
Fig. 2 is a plan view of the device illustrated in Fig. 1.
Figure 3:
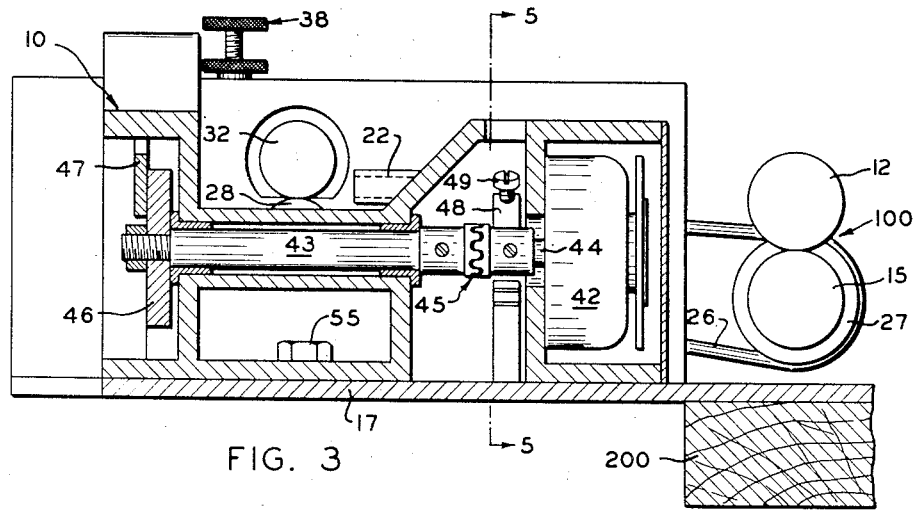
Fig. 3 is a sectional elevation taken on the line 3—3 of Fig. 2.
Figure 4:
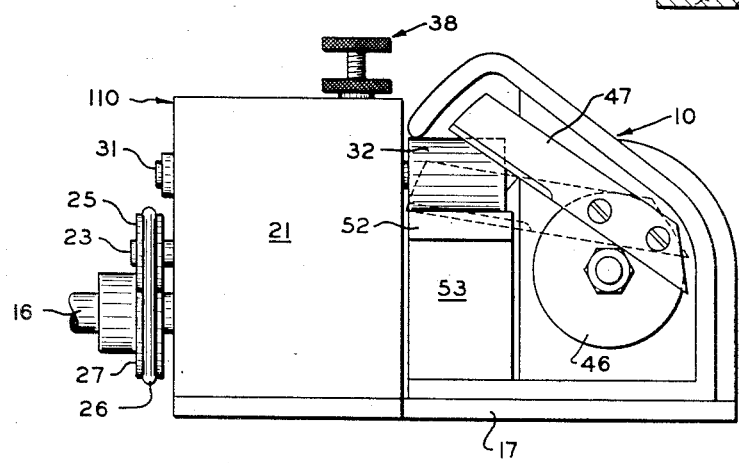
Fig. 4 is an end elevation of the device shown in Fig. 1.
Figure 5:
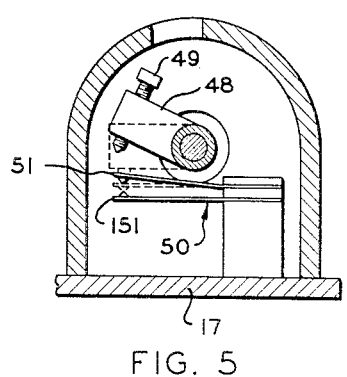
Fig. 5 is a sectional elevation taken on the line 5—5 of Fig. 3.

As shown particularly well in Figs. 2 and 4, the movable knife member 47 is adapted to cooperate with a stationary knife blade 52 which may be adjustably supported upon the end surface of a support block 53. Block 53 may be formed as a part of the cutter casting or may be secured to the base of the cutter casting so that the block itself is adjustable in either direction longitudinally of the flow of the continuous material.

The cutter housing is provided with a pair of longitudinally extending slots 54. These slots 54 permit the cutter housing to be adjustably secured to the base plate 17 by means of suitable bolts 55 whereby the cutter housing, as a unit, may be advanced in the direction of flow of the continuous material, or may be retracted towards the delivery mechanism 100. This expedient provides means for adjusting the location of the cut with respect to the leading edge or the trailing edge of a thick portion of the material and, as will presently appear, may also be used to adjust for the flow speed of the continuous material.

With the cutting apparatus 10 located to receive the discharge of the delivery mechanism 100, it becomes necessary to synchronize the cutting apparatus to the linear speed of the discharged material 33. Hence, the material 33 must be advanced to the knife member 47 and the stationary blade 52 at the same rate that it enters the apparatus 10. This may be accomplished by utilizing the power input to the delivery mechanism 100 to drive the feed means of the cutting apparatus 10 by a direct power take-off from the delivery mechanism to the feed means of the cutting apparatus and through an overdrive connection. It is for this reason that the belt pulley 27 on the shaft 16 of the delivery mechanism is of a considerably larger diameter than the belt pulley 25 on the shaft 23 of the feed means in the cutting apparatus whereby shaft 23 and the feed rolls 28 and 32 are rotated at a greater peripheral speed than the delivery rolls 12 and 15 of the delivery mechanism. By this arrangement, the feed rolls 28 and 32 slip on the material passing therethrough because of this overdrive connection so that the feed rolls 28 and 32 will advance the material engaged thereby at a linear rate which is substantially similar to that at which the delivery rolls 12 and 15 advance the material towards the cutting apparatus.

The attainable degree of rotation of the solenoid is fixed, i. e., 25°. Assuming a constant rate of advancement, adjustment of the cutting means to a given rate of advancement of the continuous material is made possible by sliding the cutter casting longitudinally of the base plate 17 to accommodate for this rate. When the cutting apparatus 10 is employed as an accessory to an existing machine, these adjustments just described permit the accommodation of the cutter for different linear speeds imparted to the material which is fed to the apparatus 10 by reason of the particular speed characteristics of the delivery mechanism with which the apparatus 10 is to be associated. At the same time, this adjustment may be used in the manner previously mentioned for the purpose of locating the position of the cut with respect to the leading edge or the trailing edge of the thick portions of the material undergoing cutting.

In general, considerable tolerance is allowed in locating the position of the cutting operations of the character with which this invention is concerned. For example, a variation of an eighth of an inch, or even slightly more, will be satisfactory. Under these conditions, normal variations to be expected in the peripheral speed at which the delivery rolls 12 and 15 are driven will permit the location of the cut to take place within satisfactory limits with respect to the leading edge or trailing edge of the thick portion of the material.

In using an electrical system which employs a rotary solenoid to drive the rotatable knife member 47, it is essential to cause rotation of the solenoid to its full extent. It is possible to energize the solenoid from an alternating current source supplied to a circuit including, in addition to the solenoid, a rectifier and a condenser and having a switch which permits the circuit to be closed for actuation of the solenoid upon elevation of the floating arm 29 when a thick portion of the material 33 is passing between the feed rolls 28 and 32. Since elevation of the arm 29 is only momentary, closure of the switch will also be momentary. Such a circuit would be ideal except for the fact that more than momentary energization of the solenoid is needed to effect its full rotation.

It is to overcome this difficulty that a relay is employed in the actuator circuits of my invention. The relay permits a circuit design wherein the solenoid may be maintained in energized condition for a time sufficient to allow it to make its full stroke and wherein the solenoid may be cut out or de-energized after it has rotated fully. Several types of circuit may be employed for this purpose. As will hereinafter become apparent, all such circuits possess the common feature of delaying the operation of the relay after arm 29 has descended following the passage of a thick portion of the material between the feed rolls 28 and 32 to the end of maintaining the solenoid energized for the desired time interval.

Figure 6:
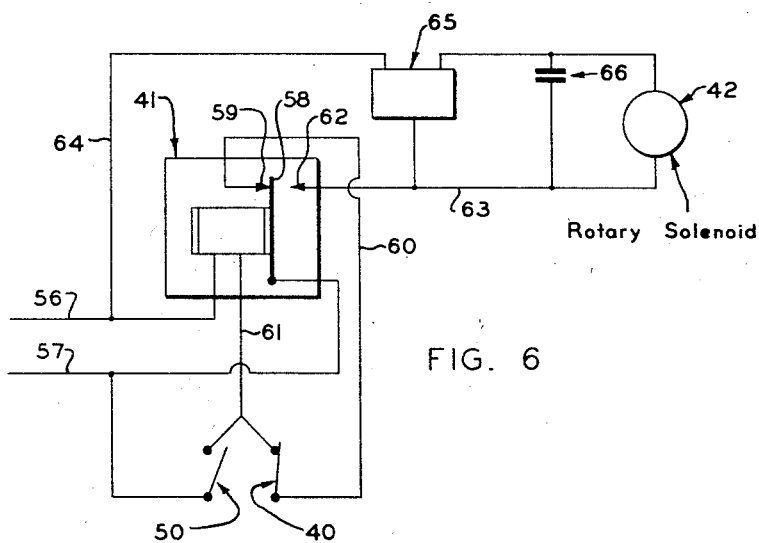
Fig. 6 is a schematic representation of an electrical circuit used with the cutting apparatus of Figs. 1 through 5.

A type of circuit, such as that shown in connection with Figs. 1 through 5, is schematically illustrated in Fig. 6. Leads 57 and 56, from a 110 volt alternating current source, are connected, respectively, to the armature 58 and the coil of the relay 41. One armature contact 59 of the relay 41 is connected through a lead 60 to one side of the switch 40, the other side of the switch 40 being connected through a lead 61 to the coil of the relay. The second armature contact 62 of the relay is connected through a lead 63 to one side of the rotary solenoid 42 whereby one side of the line may be connected through lead 57, the armature 58 and the lead 63 to the solenoid. The other side of the line is connected through a lead 64 to the solenoid. A rectifier 65 and a condenser 66 are connected across leads 63 and 64 whereby to convert the alternating current to direct current for actuation of the solenoid. Rectifier 65 is a conventional cuprous oxide or selenium rectifier. The condenser 66 is a polarized condenser and may have a capacity of 80 microfarads at 150 volts. Condenser 66 is employed to reduce or smooth out the ripple in the direct current for the solenoid.

Switch 40 is normally closed by the contact screw 38 of the floating arm 29. The lead 57 from the supply source may also be connected to the lead 61, by means of the switch 50 operated by the arm 48 and contact screw 49 fixed to the coupling 45 for the solenoid shaft.

In the circuit of Fig. 6, the relay 41 may be energized when the switches 40 and 50 are respectively closed and opened, as shown. At such time a thin portion of material is between feed rolls 28 and 32. Upon the arm 29 being elevated, switch 40 opens. This de-energizes the relay 41 and the armature 58 thereof moves into bearing with the contact 62 thereby establishing a circuit from the line to the solenoid 42 to cause actuation of the solenoid. It may be observed that at this time the switch 50 is open. Therefore, when the contact screw 38 closes, the switch 40, immediately after a thick portion of material has passed between the feed rolls 28 and 32, the relay will remain unenergized since the line current is by-passing the relay. However, the solenoid 42, at the end of its stroke, causes the arm 48 and contact screw 49 to close the switch 50 thereby placing the relay back in the line circuit. When the relay is thus re-energized, the armature 58 is brought into bearing with the contact 59 and the solenoid is cut out of the circuit. The spring return of the solenoid then rotates it back to its initial position. However, when the solenoid is returned, the switch 50 is opened because of the release of pressure thereon by contact screw 49 and the circuit is returned to the condition illustrated in Fig. 6.

It is to be noted that in the circuit of Fig. 6, the rotation of the solenoid 42 is initiated upon de-energizing the relay 41. As an alternative to this procedure, a circuit may be employed wherein the relay is energized to initiate rotation of the solenoid. In such an alternative, the armature contact 59 is connected to the solenoid, the rectifier 65 and condenser 66 being connected across the lead from this contact and the lead 64 from the line. Also, the switch 40 normally remains open and is closed upon elevation of the idler roll 28 and the arm 29. The second contact for the armature in this alternative construction remains unconnected but the armature pivot is connected to one side of the switch 40 through a switch similar to the switch 50 in construction and in operation. The second switch is normally closed but is opened by the arm 48 and the contact screw 49, carried by the coupling 45, when the solenoid reaches the end of its stroke, so as to deenergize the solenoid. Both the relay and the solenoid remain de-energized until the floating arm 29 is again raised.

Figure 7:
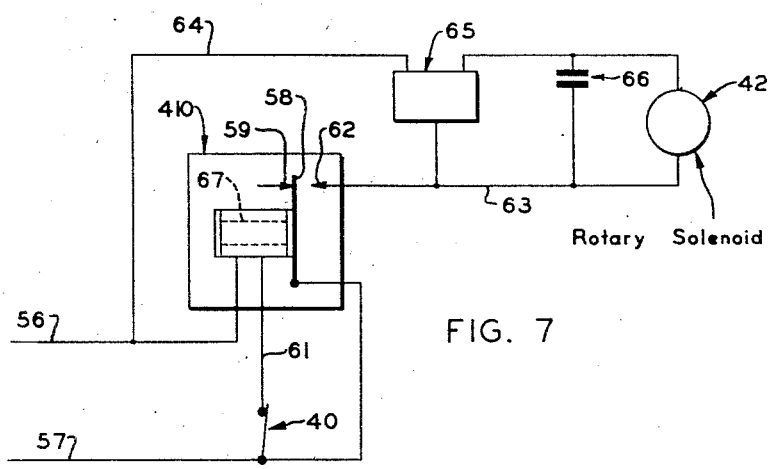
Fig. 7 is a schematic representation of another electrical circuit.

Further types of circuit may be utilized to advantage. For example, a circuit similar to that shown in Fig. 6 is disclosed in Fig. 7. In the circuit in Fig. 7, the switch 50 and actuator arm 48 and contact screw 49 are eliminated. This is made possibly by the use of a copper sleeve or copper slug which is associated with the relay to delay the operation thereof for a time sufficient to permit the solenoid to carry out its full degree of rotation for the cutting operation. Use of a copper member for delaying operation of a relay is conventional in the art and relays provided therewith are commercially available. The relay 410 of Fig. 7 is similar to the relay 41 of Fig. 6 except for a hollow cylindrical sleeve 67 which is shown in dotted lines as mounted within the coil of the relay and extending from end to end thereof. In lieu of the sleeve 67, a copper slug comprising an annular shaped member may be mounted at the armature end of the relay coil.

In Fig. 7, wherein elements similar to those in the circuit of Fig. 6 bear similar reference characters, there is only one switch in the line supply lead 57. This is the switch 40 which connects lead 57 to lead 61 from the coil of the relay 410. Normally, that is when arm 29 is in its down position, switch 40 is closed and relay 410 is energized with the result that the armature 58 is in bearing with the armature contact 59 which in the arrangement specifically illustrated in Fig. 7 is kept unconnected in the actuator circuit. Opening of the switch 40, when the arm 29 is elevated, is only momentary after which the switch is closed. As will be apparent from observation of Fig. 7, when switch 40 is opened, the relay 410 is de-energized and its spring-loaded armature 58 is moved into bearing with the contact 62 connected by lead 63 to the rotary solenoid 42. Under ordinary circumstances, when the switch 40 in Fig. 7 is again closed, the solenoid 42 would be immediately cut out. This would result in incomplete actuation of the solenoid. To avoid this, use is made of a copper slug or sleeve associated with the coil of the relay 410.

As it is well understood to the art, devices of this character will delay actuation of a relay for a period of from 0.1 second to 0.2 second. In effect, both types of delay member provide a lag coil which delays operation of the solenoid. By placing a copper slug at the yoke end of the relay, instead of at the armature end thereof, a slow release of the armature is obtained. Generally speaking, a time interval of about one-tenth of a second is sufficient to permit full operation of the solenoid which is of a character that is quick acting. It will be understood that the specific time delay relays have been disclosed for illustrative purposes and that the invention may be practiced with any relay of the type which permits a satisfactory time delay.

The type of relay shown in Fig. 7 may be described as a delay-attract type. A delay-release type of relay, making use of a copper slug, may also be provided. In this form, both the relay and the solenoid are normally de-energized and the switch 40 is closed when the floating arm 29 is raised. In this arrangement, the armature contact 59 in Fig. 7 is connected to the solenoid while the contact 62 is kept unconnected in the circuit. As a result, the solenoid is energized when the relay is energized. When the arm 29 has returned to its normal position, the switch 40 is again opened. The use of a copper slug at the yoke end of the relay in this circuit arrangement will delay the release of the relay over a time sufficient to permit the solenoid to actuate to its full extent.

While the cutting apparatus 10 has been specifically illustrated and described in conjunction with an existing machine, and as operating upon material which is supplied to the apparatus while undergoing movement, it will be appreciated that the cutting apparatus of my invention may be driven by a power source which is independent of any existing machine and may operate upon material furnished from a normally stationary supply. In the latter instance, the shaft 23 may be connected by any conventional drive means to a power source which is individual to the cutting apparatus 10 and the material to be cut may be drawn from a coiled supply contained in a storage bin or box or from a rotatably mounted roll by engaging the material between the feed rolls 28 and 32.

From the foregoing it will be appreciated that the aims and objects of my invention have been accomplished. I have provided a simple attachment or accessory for use with an existing machine for the purpose of cutting material delivered by the machine to the cutting apparatus of my invention, as well as cutting apparatus susceptible of independent use. It is to be observed that moving parts of the apparatus 10 may be enclosed so that danger of injury is materially reduced. Likewise, it will be appreciated that the simplicity of the machine lends itself to ease of adjustment and maintenance and operation.

Since certain changes may be made in the above apparatus without departing from the scope of the invention herein involved, it is intended that all matter contained in the above description, or shown in the accompanying drawings, shall be interpreted as illustrative and not in a limiting sense.

What I claim is:

1. In apparatus for cutting strips from continuous material such as ribbon, webbing and the like, in combination, continuously driven delivery means comprising a pair of rotatably mounted delivery rolls adapted to engage said material therebetween and to effect lengthwise movement of the material; a pair of rotatably mounted feed rolls positioned on the discharge side of said delivery rolls and receiving and engaging the material delivered by said delivery rolls and continuing its lengthwise advance; rotatable cutter means on the discharge side of said feed rolls and in the path of the material advanced by said feed rolls; means for driving said feed rolls from said delivery means whereby to continue the advance of said material by said feed rolls towards said cutter means at a rate substantially similar to the rate at which the material is advanced to said feed rolls by said delivery means; said rotatable cutter means comprising a rotatably mounted knife member rotatable into the path of the material advanced by said feed rolls and means connected to said knife member and comprising a rotary solenoid for rotating said knife member to effect a cutting operation; a source of electricity connectable to said solenoid; mounting means for mounting one of said feed rolls for movement towards and away from the other feed roll in accordance with thickness variations of the material engaged between said feed rolls, said mounting means including a member which is moved upon movement of the movable mounted feed roll and which provides means for connecting said solenoid to said source of electricity whereby portions of the material having a thickness greater than a predetermined minimum thickness cause said member to effect the connection of said source of electricity to said solenoid to energize the solenoid and rotate said knife member for a cutting operation; and means for disconnecting said solenoid from said source of electricity after said knife member has cut said material.

2. Apparatus for cutting strips from continuous material such as ribbon, webbing and the like and which comprises rotatable feed means for drawing said material from a supply and for advancing said material lengthwise of itself; means for continuously rotating said feed means; rotatable cutter means located in the path of the material advanced by said feed means for severing said material and comprising a rotatably mounted knife member rotatable into the path of said material, a blade member over which said material is moved and which is located with respect to said knife member for bearing contact when said knife member is rotated towards and through said material whereby said members cooperate to cut material advancing over said blade member, drive means for rotating said knife member connected to said knife member and comprising a rotary solenoid rotatable upon energization from an at rest position through a cutting stroke and returnable to said at rest position upon de-energization; said feed means comprising a pair of rotatable feed rolls between which the material is engaged and by which the material is advanced lengthwise of itself towards said cutter means; a source of electricity connectable with said solenoid; actuator means operated by said feed means for placing said solenoid in circuit with said source of electricity to energize said solenoid and rotate said knife member upon the engagement between said feed rolls of a portion of said material having a thickness greater than a predetermined minimum thickness, said actuator means comprising a pivotally mounted arm having means thereon for effecting the connection of said solenoid to said source of electricity upon pivotal movement of said arm whereby said arm is rocked about its pivot in accordance with thickness variations of the material engaged between said feed rolls; means for disconnecting said solenoid from said source of energy after said knife member has completed a cutting stroke; a support; means mounting said feed means and actuator means at a fixed location on said support; and means mounting said cutter means, including said knife and blade members and drive means therefor, on said support and independently of said feed means for adjustment as a unit longitudinally of the path of flow of the material advanced by said feed means and towards and away from said feed means.

3. In apparatus for cutting strips from continuous material such as ribbon, webbing and the like characterized by having thick portions at intervals spaced lengthwise of the material, in combination, rotatable feed means comprising a pair of rotatable feed rolls between which the material is engaged and by which the material is advanced lengthwise of itself, the axis of a first one of said feed rolls being movably mounted relative to the axis of the second one of said feed rolls; means for continuously rotating said feed means; rotatable cutter means located in the path of the material advanced by said feed means for severing said material and comprising a rotatably mounted knife member rotatable into the path of said material, means individual to said rotatably mounted knife member comprising a rotary solenoid for rotating said knife member to effect a cutting operation; means for coupling said solenoid to said knife member for effecting the rotation of said knife member upon the rotation of said solenoid; a source of electricity connectable to said solenoid; actuator means operated by the movement of said first one of said feed rolls away from the second one of said feed rolls for connecting said solenoid with said source of electricity to energize said solenoid and rotate said knife member upon engagement between said feed rolls of a portion of said material having a thickness greater than a predetermined minimum thickness, said actuator means including a member pivoted on said feed means for operating said means for connecting said solenoid to said source of electricity; and means for disconnecting said solenoid from said source of electricity after said knife member has cut said material.

4. Apparatus for cutting strips from continuous material such as ribbon, webbing and the like and wherein said apparatus comprises rotatable feed means having a first rotatable feed roll and a second rotatable feed roll together providing a pair of feed rolls between which the material is engaged and by which the material is advanced lengthwise of itself, the axis of said first feed roll being movably mounted relative to the axis of said second feed roll; drive means for continuously rotating said feed means, said drive means being individual to said feed means; rotatable cutter means comprising a rotatably mounted cutter shaft, a knife member fixed to one end of said shaft for rotation therewith, a rotary solenoid of the spring actuated return type having a rotatable armature providing drive shaft means, coupling means connecting said solenoid drive shaft and said cutter shaft in driving relation, said cutter means being positioned on the discharge side of said feed means and with said knife member positioned for rotation into the path of the material advanced by said feed means for severing said material on the energization of said solenoid; a source of electricity connectable to said solenoid; actuator means operated upon movement of said first feed roll, in a direction away from said second feed roll and in response to an increase in thickness of the material being advanced, for connecting said solenoid with said source of electricity to energize said solenoid and rotate said knife member upon the engagement between said feed rolls of a portion of said material having a thickness greater than a predetermined minimum thickness, said actuator means including a member pivoted on said feed means for operating said means for connecting said solenoid to said source of electricity; and means for disconnecting said solenoid from said source of electricity after said knife member has carried out a cutting operation.

5. In apparatus for cutting strips from continuous material such as ribbon, webbing and the like characterized by having thick portions at intervals spaced lengthwise of the material, in combination, rotatable feed means, comprising a pair of rotatable feed rolls between which the material is engaged and by which the material is advanced lengthwise of itself, the axis of a first one of said feed rolls being movably mounted relative to the axis of the second one of said feed rolls; means for continuously rotating said feed means; rotatable cutter means located in the path of the material advanced by said feed means for severing said material and comprising a rotatably mounted knife member rotatable into the path of said material; means comprising a rotary solenoid for rotating said knife member to effect a cutting operation; means coupling said solenoid to said knife member for effecting the rotation of said knife member upon the rotation of said solenoid; a source of electricity connectable to said solenoid; actuator means operated by the movement of said first one of said feed rolls away from the second one of said feed rolls for connecting said solenoid with said source of electricity to energize said solenoid and rotate said knife member upon the engagement between said feed rolls of a portion of said material having a thickness greater than a predetermined minimum thickness, said actuator means including a member pivoted on said feed means for operating said means for connecting said solenoid to said source of electricity; relay means connected in a circuit with said solenoid and said source of electricity and operable upon the closing of said circuit and energization of the solenoid for maintaining the solenoid connected to said source of electricity after passage of a thick portion of said material through said feed means; and means for disconnecting said solenoid from said source of electricity after said knife member has cut said material.

6. In apparatus as defined in claim 5 for cutting strips from continuous material, an arm member rotatable with said solenoid and operable at the end of the stroke of said solenoid for actuating said means for disconnecting said solenoid from said source of electricity.

References Cited in the file of this patent

UNITED STATES PATENTS

| Number | Name | Date |
| --- | --- | --- |
| 1,128,518 | Rohland | Feb. 16, 1915 |
| 1,263,413 | Holm-Hansen | Apr. 23, 1918 |
| 1,711,561 | Evans et al. | May 7, 1929 |
| 1,958,138 | Fowler et al. | May 8, 1934 |
| 1,984,937 | Livinson et al. | Dec. 18, 1934 |
| 2,097,336 | Moulton | Oct. 26, 1937 |
| 2,127,265 | Martin | Aug. 16, 1938 |
| 2,155,578 | Anderson | Apr. 25, 1939 |
| 2,343,887 | Crane | Mar. 14, 1944 |
| 2,519,201 | Seidman | Aug. 15, 1950 |